United States Patent
Wang et al.

(10) Patent No.: US 10,950,883 B1
(45) Date of Patent: Mar. 16, 2021

(54) FLOW CELL SYSTEMS, FLOW CELL BATTERIES, AND HYDROGEN PRODUCTION PROCESSES

(71) Applicant: Battelle Memorial Institute, Richland, WA (US)

(72) Inventors: Wei Wang, Kennewick, WA (US); Zimin Nie, Richland, WA (US); Vincent Sprenkle, Richland, WA (US); Jamelyn D. Holladay, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 330 days.

(21) Appl. No.: 15/004,717

(22) Filed: Jan. 22, 2016

Related U.S. Application Data

(60) Provisional application No. 62/106,641, filed on Jan. 22, 2015.

(51) Int. Cl.
*H01M 8/18* (2006.01)
*C25B 5/00* (2006.01)
(Continued)

(52) U.S. Cl.
CPC .............. *H01M 8/188* (2013.01); *C25B 1/04* (2013.01); *C25B 5/00* (2013.01); *H01M 8/20* (2013.01); *B01J 19/127* (2013.01)

(58) Field of Classification Search
None
See application file for complete search history.

(56) References Cited

U.S. PATENT DOCUMENTS

| | | | | |
|---|---|---|---|---|
| 4,262,066 A | * | 4/1981 | Brenneman | H01M 14/005 429/111 |
| 4,460,444 A | * | 7/1984 | Maskalick | C25B 1/04 205/619 |

(Continued)

FOREIGN PATENT DOCUMENTS

| | | | | |
|---|---|---|---|---|
| JP | 2001/233602 | | 8/2001 | |
| JP | 2001-233602 A | * | 8/2001 | ............... C25B 1/04 |

(Continued)

OTHER PUBLICATIONS

Ellis et al, Study of n-Type Semiconducting Cadmium Chalcogenide-Based Photoelectrochemical Cells Employing Polychalcogenide Electrolytes, Journal of the American Chemical Society, vol. 99, No. 9, Apr. 1977, pp. 2839-2848 (Year: 1977).*

(Continued)

*Primary Examiner* — Harry D Wilkins, III
(74) *Attorney, Agent, or Firm* — Wells St. John P.S.

(57) ABSTRACT

Flow cell systems are provided. Example flow cell systems can include an $H^+/H_2$ half-cell and a counterpart $Fe^{3+}/Fe^{2+}$ or $V^{5+}/V^{4+}$ half-cell. Flow cell systems can also include a half-cell in fluid communication with an electrolyte regeneration chamber. Embodiments of these flow cells systems can be configured to produce hydrogen through electrolysis. Flow cell battery systems are also disclosed. Example flow cell battery systems can include an $H^+/H_2$ analyte; and a counterpart $Fe^{3+}/Fe^{2+}$ or $V^{5+}/V^{4+}$ catholyte. Processes for generating hydrogen are also disclosed. Example processes can include generating protons from a $Fe^{3+}/Fe^{2+}$ or $V^{5+}/V^{4+}$ electrolyte solution; and reacting the protons with $H_2O$ to form $H_2$.

11 Claims, 10 Drawing Sheets

(51) Int. Cl.
  *B01J 19/12*  (2006.01)
  *H01M 8/20*  (2006.01)
  *C25B 1/04*  (2021.01)

(56)  References Cited

U.S. PATENT DOCUMENTS

| | | | |
|---|---|---|---|
| 4,608,137 A * | 8/1986 | Vaughan | C25B 3/00 |
| | | | 205/637 |
| 4,786,567 A | 11/1988 | Skyllas-Kazacos et al. | |
| 5,250,158 A | 10/1993 | Kaneko et al. | |
| 5,711,865 A | 1/1998 | Caesar | |
| 6,063,258 A * | 5/2000 | Sayama | C01B 13/0207 |
| | | | 204/157.15 |
| 6,093,501 A | 7/2000 | Werth | |
| RE36,985 E * | 12/2000 | Trainham, III | C25B 9/10 |
| | | | 205/621 |
| 6,737,189 B1 | 5/2004 | Vandayburg et al. | |
| 7,754,183 B2 | 7/2010 | Keskar et al. | |
| 8,628,880 B2 | 1/2014 | Li et al. | |
| 8,771,856 B2 | 7/2014 | Li et al. | |
| 9,023,529 B2 | 5/2015 | Liu et al. | |
| 9,123,931 B2 | 9/2015 | Li et al. | |
| 9,130,218 B2 | 9/2015 | Wang et al. | |
| 9,214,695 B2 | 12/2015 | Wang et al. | |
| 9,236,620 B2 | 1/2016 | Li et al. | |
| 9,406,960 B2 | 8/2016 | Xiao et al. | |
| 9,421,521 B2 | 8/2016 | Danilovic et al. | |
| 9,543,609 B2 | 1/2017 | Amstutz et al. | |
| 2004/0241552 A1 | 2/2004 | Skyllas-Kazacos | |
| 2010/0310941 A1 | 12/2010 | Kumta et al. | |
| 2011/0014532 A1 * | 1/2011 | Knuckey | H01M 4/9008 |
| | | | 429/416 |
| 2011/0195342 A1 | 8/2011 | Luo et al. | |
| 2011/0212384 A1 | 9/2011 | Luo et al. | |
| 2012/0077068 A1 | 3/2012 | Wang et al. | |
| 2013/0273459 A1 | 10/2013 | Xu et al. | |
| 2014/0234536 A1 | 8/2014 | Xu et al. | |
| 2014/0234735 A1 | 8/2014 | Zhang et al. | |
| 2015/0147673 A1 | 5/2015 | Li et al. | |
| 2017/0179558 A1 * | 6/2017 | Mckone | H01L 31/053 |
| 2018/0269515 A1 * | 9/2018 | Wang | H01M 8/04925 |

FOREIGN PATENT DOCUMENTS

| | | |
|---|---|---|
| JP | 2011-510466 | 3/2011 |
| WO | WO 89/05363 | 6/1989 |
| WO | WO 2008/123911 | 10/2008 |

OTHER PUBLICATIONS

Maeda, Z-Scheme Water Splitting Using Two Different Semiconductor Photocatalysts, ACS Catalysis, vol. 3, No. 7, May 2013, pp. 1486-1503 (Year: 2013).*

Kaneshiro et al, Advances in copper-chalcopyrite thin films for solar energy conversion, Solar Energy Materials and Solar Cells, vol. 94, No. 1, Jan. 2010, pp. 12-16 (Year: 2010).*

Han, Photo-electrochemical Hydrogen Production, Tehcnical Report by MVSystems, Inc for US Dept of Energy, Dec. 2013, available at http://osti.gov/biblio/1111421 (Year: 2013).*

Ayers et al., "(Industrial Electrochemisrty & Electrochemical Engineering Division NET Award) Development of Large Scale Commerical PEM Electrolysis", ECS Meeting Abstracts 1205-1205, available online at http://ma.ecsdl.org/content/MA2015/01/16/1205.short, 2015, 2 pages.

Ayers et al., "Characteriztion of Iron (VI) Compounds and Their Discharge Products in Strongly Alkaline Electrolyte", Journal of Electrochemical Society vol. 152, 2005, United States, pp. A467-A473.

Ayers et al., "Research Advances Towards Low Cost, High Efficiency PEM Electrolysis", ECS Transactions vol. 33, 2010, United States, pp. 3-15.

Ayers, "Low-Noble-Metal-Content Catalysts/Electrodes for Hydrogen Production by Water Electrolysis", DOE Annual Merit Review, available online at http://www.hydrogen.energy.gov/pdfs/review15/pd098_ayers_2015_o.pdf, 2015, 24 pages.

Bashyarn et al., "A Class of Non-Precious Metal Composite Catalysts for Fuel Cells", Nature vol. 443, 2006, United Kingdom, pp. 63-66.

Bullis, "Hydrogen Storage Could Be Key to Germany's Energy Plans", MIT Technology Review, available online at http://www.technologyreview.com/s/427360/hydrogen-storage-could-be-key-to-germanys-energy-plans/, Mar. 2012, 4 pages.

Candelaria et al., "Nanostructured Carbon for Energy Storage and Conversion", Nano Energy vol. 1, 2012, Netherlands, pp. 195-220.

Chang et al., "Functional Links Between Stability and Reactivity of Strontium Ruthenate Single Crystals During Oxygen Evolution", Nature Communications vol. 5, 2014, United Kingdom, 9 pages.

Chen et al., "Highly Crystailine Multimetallic Nanoframes with Three-Dimensional Electrocatalytic Surfaces", Science vol. 343, 2014, United States, pp. 1339-1343.

Debe et al., "Initial Perfromance and Durability of Ulta-Low Loaded NSTF Electrodes for PEM Electrolyzers", Journal of The Electrochemical Society vol. 159, 2012, United States, pp. K165-K176.

Department of Energy, "Grid Energy Storage", U.S. Department of Energy, availiable online at http:///energy.gov/sites/prod/files/2014/09/f18/Grid%20Energy%20Storage%20December%202013.pdf, 2013, 67 pages.

European Wind and Energy Association, "Wind in Power: 2011 European Statistics", available online at http://www.ewea.org/fileadmin/files/library/publications/statistics/Wind_in_power_2011_European_statistics.pdf, Feb. 2012, 11 pages.

Fachverband Biogas e.V., "Biogas Segment Statistics 2014", available online at http://www.biogas.org/edcom/webfvb.nsf/id/DE_Branchenzahlen/, 2014, 2 pages.

Han et al., "Diffusional Motion of Redox Centers in Carbonate Electrolytes", Journal of Chemical Physics vol. 141, 2014, United States, 8 pages.

James et al., "PEM Electrolysis H2A Production Case Study Documentation", Department of Energy, available online at http://www.hydrogen.energy.gov/pdfs/h2a_pem_electrolysis_case_study_documentation.pdf, 2013, 27 pages.

Jaouen et al., "Recent Advances in Non-Precious Metal Catalysis for Oxygen-Reduction Reaction in Polymer Electrolyte Fuel Cells", Energy and Environmental Science vol. 4, 2011, United Kingdom, pp. 114-130.

Kim et al., "1 kW/1kWh Advanced Vanadium Redox Flow Battery Utilizing Mixed Acid Electrolytes", Journal of Power Sources vol. 237, 2013, Netherlands, pp. 300-309.

Koh et al., "Activity-Stability Relationships of Ordered and Disordered Alloy Phases of Pt3Co Electrocatalysts for the Oxygen Reduction Reaction (ORR)", Electrochimica Acta vol. 52, 2007, United Kingdom, pp. 2765-2774.

Kou et al., "Stabilization of Electrocatalytic Metal Nanoparticles at Metal-Metal Oxide-Graphene Triple Junction Points", Journal of the American Chemical Society vol. 133, 2011, United States, pp. 2541-2547.

Li et al., "A Stable Vanadium Redox-Flow Battery with High Energy Density for Large-scale Energy Storage", Advanced Energy Materials vol. 1, 2011, Germany, pp. 394-400.

Li et al., "Ambipolar Zinc-Polyiodide Electrolyte for High Energy Density Aqueous Redox Flow Battery", Nature Communications vol. 6, 2015, United Kingdom, 8 pages.

Li et al., "Bismuth Nanoparticle Decorating Graphite Felt as a High-Performance Electrode for an All-Vanadium Redox Flow Battery", Nano Letters vol. 13, 2013, United States, pp. 1330-1335.

Li et al., "Nanorod Niobium Oxide as Powerful Catalysts for an all Vanadium Redox Flow Battery", Nano Letters vol. 14, 2013, United States, pp. 158-165.

Li et al., "Capacity Decay Mechanism of Microporous Separator-Based All-Vanadiun Redox Flow Batteries and its Recovery", ChemSusChem vol. 7, 2014, Germany, pp. 577-584.

(56) References Cited

OTHER PUBLICATIONS

Li et al., "Fe/V Redox Flow Battery Electrolyte Investigation and Optimization", Journal of Power Sources vol. 229, 2013, Netherlands, pp. 1-5.

Litter, "Heterogeneous Photocatalysis: Transition Metal Ions in Photocatalytic Systems", Applied Catalysis B: Environmental vol. 23, 1999, Netherlands, pp. 89-114.

Martin et al., "Time-Resolved Microwave Conductivity Part 2—Quantum-Sized $TiO_2$ and the Effects of Adsorbates and Light Intensity on Charge-Carrier Dynamics", Journal of the Chemical Society, Faraday Transactions vol. 90, 1994, United Kingdom, pp. 3323-3330.

Onno e al., "Unique Effects of Iron(III) Ions on PhotocatArtic and Photoelectrochemical Properties of Titanium Dioxide", Journal of Physical Chemistry B vol. 101, 1997, United States, pp. 6415-6419.

Paciok et al., "Sensivity Analysis of a PEM Electrolyser Cathode with Respect to the Platinum and Nafion Loading", Electrochemical Society Meeting Abstracts 1562-1562, available online at http://ma.ecsdl.org/content/MA2015-01/26/1562.short, 2015, 2 pages.

Perry et al., "High Power Density Redox Flow Battery Cells", ECS Transactions vol. 53, 2013, United States, pp. 7-16.

Rahman et al., "Vanadium Redox Battery: Positive Half-Cell Electrolyte Studies", Journal of Power Sources vol. 189, 2009, Netherlands, pp. 1212-1219.

Ramaswamy et al., "Fundamental Mechanistic Understanding of Electrocatalysis of Oxygen Reduction on Pt and Non-Pt Surfaces: Acid Versus Alkaline Media", Advances in Physical Chemistry, 2012, Egypt, 17 pages.

Reiche et al., "Heterogeneous Photocatalytic and Photosynthetic Depostition of Copper on $TiO_2$ and $WO_3$ Powders", Journal of Physical Chemistry vol. 83, 1979, United States, pp. 2248-2251.

Roller et al., "Flame-Based Processing as a Practical Approach for Manufacturing Hydrogen Evolution Electrodes", Journal of Power Sources vol. 271, 2014, Netherlands, pp. 366-376.

Sauve et al., "Dye Sensitization of Nanocrystalline Titanium Dioxide Osmium and Ruthenium Polypyridyl Complexes", Journal of Physical Chemistry B vol. 104, 2000, United States, pp. 6821-6836.

Sclafani et al., "N2 Photoreduction and Phenol Heterogeneous Isomers Photooxidation as Examples of Heterogeneous Photocatalytic Reactions", Research on Chemical Intermediates vol. 18, 1993, Germany, pp. 211-226.

Sclafani et al., "Phatocatalytic Degradaton of Phenol in Aqueous Polycrystalline $TiO_2$ Dispersions: The Influence of $Fe^{3+}$, $Fe^{2+}$ and $Ag^+$ on the Reaction Rate", Journal of Photochemistry and Photobiology A: Chemistry vol. 56, 1991, Netherlands, pp. 113-123.

Seley et al., "Combinatorial Search for Improved Metal Oxide Oxygen Evolution Electrocatalysts in Acidic Electrolytes", ACS Combinatorial Science vol. 15(2), 2013, United States, pp. 82-89.

Shao et al., "Facile and Controllable Electrochemical Reduction of Graphene Oxide and its Applications", Journal of Materials Chemistry vol. 20, 2009, United Kingdom, pp. 743-748.

Shao et al., "Highly Reversible Mg Insertion in Nanostructured Bi for Mg Ion Batteries", Nano Letters vol. 14, 2014, United States, pp. 255-260.

Shao et al., "Nitrogen-Doped Mesoporus Carbon for Energy Storage in Vanadium Redox Flow batteries", Journal of Power Sources vol. 195, 2010, Netherlands, pp. 4375-4379.

Shao et al., "Novel Catalyst Support Materials for PEM Fuel Cells: Current Status and Future Prospects", Journal of Materials Chemistry vol. 19, 2009, United Kingdom, pp. 46-59.

Stamenkovic et al., "Improved Oxygen Reduction Activity on Pt3Ni(111) Via Increased Surface Site Availability", Science vol. 315, 2007, United States, pp. 493-497.

Tucker et al., "Performance and Cycling of the Iron-Ion/Hydrogen Redox Flow Cell with Various Catholyte Salts", Journal of Applied Electrochemistry vol. 43, 2013, Netherlands, pp. 637-644.

Tylus et al., "Elucidating Oxygen Reduction Active Sites in Pyrolyzed Metal-Nitrogen Coordinated Non-Previous-Metal Electrocatalyst Systems", Journal of Physical Chemistry C vol. 118, 2014, United States, pp. 8999-9008.

Vijayakumar et al., "Elucidating the Higher Stability of Vanadium(V) Cations in Mixed Acid Based Redox Flow Battery Electrolytes", Journal of Power Sources vol. 241, 2013, Netherlands, pp. 173-177.

Wang et al., "Li-Ion Battery with $LiFePO_4$ Cathode and $Li_4Ti_5O_{12}$ Anode for Stationary Energy Storage", Metallurgical and Materials Transactions A: Physical Metallurgy and Materials Science vol. 44A, 2013, United States, pp. 21-25.

Ward et al., "Photocurrent Enhancement via Trapping of Photogenerated Electrons of $TiO_2$ Particles", Journal of Physical Chemistry vol. 86, 1982, United States, pp. 3599-3605.

Wei et al., "Polyvinyl Chloride/Silica Nanoprous Composite Separator for All-Vanadium Redox Flow Battery Applications", Journal of the Electrochemical Society vol. 160, 2013, United States, pp. A1215-A1218.

Wei et al., "TEMPO-Based Catholyte for High Energy Density Nonaqueous Redox Flow Batteries", Advanced Materials vol. 26, 2014, United States, pp. 7649-7653.

Wei et al., "Towards High-Performance Nonaqueous Redox Flow Electrolyte through Ionic Modification of Active Species", Advanced Energy Materials vol. 5, 2015, Germany, 7 pages.

Wu et al., "High-Performance Electrocatalysts for Oxygen Reduction Derived from Polyaniline, Iron, and Cobalt", Science vol. 332, 2011, United States, pp. 443-447.

Xu et al., "Simply $AlF_3$-Treated $Li_4Ti_5O_{12}$ Composite Anode Materials for Stable and Ultrahigh Power Lithium-Ion Batteries", Journal of Power Sources vol. 236, 2013, Netherlands, pp. 169-174.

Aaron et al., "Dramatic Performance Gains in Vanadium Redox Flow Batteries Throuh Modified Cell Architecture", Journal of Power Sources vol. 206, 2012, Netherlands, pp. 450-453.

Alon et al., "Feasibility Study of Hydrogen/Ion Redox Flow Cell for Grid-Storage Applications", Journal of Power Sources vol. 240, 2013, Netherlands, pp. 417-420.

Antolini et al., "Effects of Geometric and Electronic Factors on ORR Activity of Carbon Supported Pt-Co Electrocatalysts in PEM Fuel Cells", International Journal of Hydrogen Energy vol. 30, 2005, United Kingdom, pp. 1213-1220.

Ayers et al., "Characterization of Anion Exchange Membrane Technology for Low Cost Electrolysis Modeling and Sytem Studies", ECS Transactions vol. 45, 2013, United States, pp. 121-130.

Ayers et al., "Efficient Generation of High Energy Density Fuel from Water", ECS Transactions vol. 41, 2012, United States, pp. 27-38.

Ayers et al., "Fueling Vehicles with Sun and Water", Photoelectrochemical Cells and Bilogical Devices, ECS Transactions vol. 50, 2013, United States, pp. 35-46.

Ayers et al., "Hydrogen Infrastructre Challenges and Solutions", ECS Transactions vol. 41, 2012, United States, pp. 75-83.

Ayers et al. "Recent Advances in Cell Cost and Efficiency for PEM-Based Water Electrolysis", ECS Transactions vol. 41, 2012, United States, pp. 15-22.

Chang et al., "Activity-Stability Relationship in the Surface Electrochemistry of the Oxygen Evolution Reaction", Faraday Discussions vol. 176, 2014, United Kingdom, pp. 125-133.

Crawford et al., "Comparative Analysis for Various Redox Flow Batteries Chemistries using a Cost Performance Model", Journal of Power Sources vol. 293, 2015, Netherlands, pp. 388-399.

Danilovic et al., "Activity-Stability Trends for the Oxygen Evolution Reaction on Monometallic Oxides in Acidic Environments", Journal of Physical Chemistry Letters vol. 5, 2014, United States, pp. 2474-2478.

Danilovic et al., "Using Surface Segregation to Design Stable Ru—Ir Oxides for the Oxygen Evolution Reaction in Acidic Environments", Angewandte Chemie vol. 126, 2014, United Kingdom, pp. 14240-14245.

Fajardo et al., "New Approaches to Solar-Energy Conversion Using Si/Liquid Junctions", Solar Energy Materials and Solar Cells vol. 38, 1995, Netherlands, pp. 279-303.

Fatih et al., "Advancements in the Direct Hydrogen Redox Fuel Cell", Electrochemical and Solid-State Letters vol. 11, 2008, United States, pp. B11-B15.

Fu et al., "An Integral Proton Conducting SOFC for Simultaneous Production of Ethylene and Power from Ethane", Chemical Communications vol. 46, 2010, United Kingdom, pp. 2052-2054.

(56) References Cited

OTHER PUBLICATIONS

Gasteiger et al., "Just a Dream—or Future Reality?", Science vol. 324, 2009, United States, pp. 48-49.
Greeley et al., "The Road from Animal Electricity to Green Energy: Combining Experiment and Theory in Electrocatalysis", Energy & Environmental Science vol. 5, 2012, United Kingdom, pp. 9246-9256.
Herranz et al., "Unveiling N-Protonation and Anion-Binding Effects on Fe/N/C Catalysts for O2 Reduction in Proton-Exchange-Membrane Fuel Cells", Journal of Physical Chemistry C vol. 115, 2011, United States, pp. 16087-16097.
Ji et al., "Controlling SEI Formation on SnSb-Porous Carbon Nanofibers for Improved Na Ion Storage", Advanced Materials vol. 26, 2014, United States, pp. 2901-2908.
Kim et al., "Chloride Supporting Electrolytes for All-Vanadium Redox Flow Batteries", Physical Chemistry Chemical Physics vol. 13, 2011, United Kingdom, pp. 18186-18193.
Lezama et al., "Spectroscopic Evidence on the Interaction of Prephenate, a Shikimate Pathway Intermediate, with *Oxidovanadium*(IV) Species", Inorganica Chimica Acta vol. 363, 2010, Netherlands, pp. 1593-1596.
Long et al., "Electrochemical Characterization of High-Surface-Area Catalysts and Other Nanoscale Electroactive Materials at Sticky-Carbon Electrodes", Journal of Electroanalytical Chemistry vol. 522, 2002, Netherlands, pp. 58-65.
Luo et al., "Capacity Decay and Remediation of Nafion-Based All-Vanadium Redox Flow Batteries", ChemSusChem vol. 6, 2013, Germany, pp. 268-274.
Menictas et al., "Evaluation of an NH4VO3-Derived Electrolyte for the Vanadium-Redox Flow Battery", Journal of Power Sources vol. 45, 1993, Netherlands, pp. 43-54.
Palumbo et al., "Solar Thermal Decoupled Water Electrolysis Process I: Proof of Concept", Chemical Engineering Science vol. 84, 2012, United States, pp. 372-380.
Park et al., "Oxygen Electrocatalysts for Water Electrolyzers and Reversible Fuel Cells: Status and Perspective", Energy & Environmental Science vol. 5, 2012, United Kingdom, pp. 9331-9344.
Parrondo et al., "Degradation of Anion Exchange Membranes Used for Hydrogen Production by Ultrapure Water Electrolysis", Royal Society of Chemistry Adv. 2014, 4, United Kingdom, pp. 9875-9879.
Pomykal et al., "Measurement of Interfacial Charge Transfer Rate Constants at n-type InP/CH3OH Junctions", Journal of Physical Chemistry B vol. 101, 1997, United States, pp. 2476-2484.
Pomykal et al., "Stability of n-Si/CH3OH Contacts as a Function of the Reorganization Energy of the Electron-Donor", Journal of Physical Chemistry vol. 99, 1995, United States, pp. 8302-8310.
Pomykal et al., "Theoretical and Experimental Upper Bounds on Interfacial Charge-Transfer Rate Constants Between Semiconducting Solids and Outer-Sphere Redox Couples", Journal of Physical Chemistry vol. 100, 1996, United States, pp. 3652-3664.
Sauve et al., "High Quantum Yield Sensitization of Nanocrystalline Titanium Dioxide Photoelectrodes with cis-Dicyanobis(4,4'-dicarboxy-2,2'- bipyridine)osmium(II) or Tris(4,4'-dicarboxy-2,2'-bipyridine)osmium(II) Complexes", Journal of Physical Chemistry B vol. 104, No. 15, Mar. 2000, pp. 3488-3491.
Shao et al., "Electrocatalysts for Nonaqueous Lithium Air Batteries: Status, Challenges and Perspective", ACS Catalysis vol. 2, 2012, United States, pp. 844-857.
Shao et al., "Electrochemical Investigation of Polyhalide Ion Oxidation-Reduction on Carbon Nanotube Electrodes for Redox Flow Batteries", Electrochemistry Communications vol. 11, 2009, Netherlands, pp. 2064-2067.
Shao et al., "Making Li-Air Batteries Rechargeable: Material Challenges", Advanced Functional Materials vol. 23, 2013, United Kingdom, pp. 987-1004.
Shao et al., "The Corrosion of PEM Fuel Cell Catalyst Supports and its Implications for Developing Durable Catalysts", Electrochimica Acta vol. 54, 2009, United Kingdom, pp. 3109-3114.
Shao et al. "Surface Driven Sodium Ion Energy Storage in Nanocellular Carbon Foams", Nano Letters vol. 13, 2013, United States, pp. 3909-3914.
Shreve et al., "Limits on the Corrosion Rate of Si Surfaces in Contact with CH3OH-Ferrocene+/0 and CH3OH-1,1'-Dimethylferrocene+/0 Solutions", Journal of Physical Chemistry vol. 99, 1995, United States, pp. 5575-5580.
Stephenson et al., "Electrochemical Model of the Fe/V Redox Flow Battery", Journal of the Electrochemical Society vol. 159, 2012, United States, pp. A1993-A2000.
Strmcnik et al., "Improving the Hydrogen Oxidation Reaction Rate by Promotion of Hydroxyl Adsorption", Nature Chemistry vol. 5, 2013, United Kingdom, pp. 300-306.
Subbaraman et al., "Enhancing Hydrogen Evolution Activity in Water Splitting by Tailoring Li+-Ni(OH)2-Pt Interfaces", Science vol. 334, 2011, United States, pp. 1256-1260.
Toops et al., "Evaluation of Nitrided Titanium Separator Plates for Proton Exchange Membrane Electrolyzer Cells", Journal of Power Sources vol. 272, 2014, Netherlands, pp. 954-960.
Tucker et al., "Optimization of the Iron-Ion/Hydrogen Redox Flow Cell with Iron Chloride Catholyte Salt", Journal of Power Sources vol. 245, 2014, Netherlands, pp. 691-697.
Viswanathan et al. "Cost and Performance Model for Redox Flow Batteries", Journal of Power Sources vol. 247, 2014, Netherlands, pp. 1040-1051.
Wang et al., "A New Hybrid Redox Flow Battery with Multiple Redox Couples", Journal of Power Sources vol. 216, 2012, Netherlands, pp. 99-103.
Wang et al., "A New Redox Flow Battery using Fe/V Redox Couples in Chloride Supporting Electrolyte", Energy & Environmental Science, 2011, United Kingdom, pp. 4068-4073.
Wang et al., "Ultralow Charge-Transfer Resistance with Ultralow Pt Loading for Hydrogen Evolution and Oxidation using Ru@Pt Core-Shell Nanocatalysts", Sci. Rep. 5, 2015, United States, 8 pages.
Wei et al., "Performance Evaluation of Microporous Separator in Fe/V Redox Flow Battery", ECS Transactions vol. 45, 2013, United States, pp. 17-24.
Wei et al., "Nanoporous Polytetrafluoroethylene/Silica Composite Separator as a High-Performance All-Vanadium Redox Flow Battery Membrane", Advanced Energy Materials vol. 3, 2013, Germany, pp. 1215-1220.
Zhang et al., "Effects of Additives on the Stability of Electrolytes for All-Vanadium Redox Flow Batteries", Journal of Applied Electrochemistry vol. 41, 2011, Netherlands, pp. 1215-1221.
Zhang et al., "Electrostatic Self-Assembly of a Pt-around-Au Nanocomposite with High Activity towards Formic Acid Oxidation", Angewandte Chemie International Edition vol. 49, 2010, United Kingdom, pp. 2211-2214.
Bloor et al., "Solar-Driven Water Oxidation and Decoupled Hydrogen Production Mediated by an Electron-Coupled-Proton Buffer", Journal of the American Chemical Society, 138, 2016, United States, pp. 6707-6710.
Chen of al., "Separating Hydrogen and Oxygen Evolution in Alkaline Water Electrolysis Using Nickel Hydroxide", Nature Communications, 2016, United Kingdom, pp. 1-8.
Rausch et al., "Decoupled Catalytic Hydrogen Evolution from a Molecular Metal Oxide Redox Mediator in Water Splitting", Science, 345, 2014, United States, pp. 1326-1331.

* cited by examiner

US 10,950,883 B1

FLOW CELL SYSTEMS, FLOW CELL BATTERIES, AND HYDROGEN PRODUCTION PROCESSES

CROSS REFERENCE TO RELATED APPLICATION

This application claims priority to U.S. Provisional Patent Application Ser. No. 62/106,641 which was filed on Jan. 22, 2015, the entirety of which is incorporated by reference herein.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The present disclosure relates to flow cell systems and processes for utilizing flow cell systems. Particular embodiments of the disclosure relate to flow cell systems having half-cells with particular anolytes and counterpart half-cells with particular catholytes. Embodiments of the disclosure also include flow cell batteries as well as processes for electrolyzing processes.

BACKGROUND

Hydrogen production by water electrolysis has attracted great interest. However, the oxygen electrode has substantial limitations on the cost, performance, and durability because of the common use of a noble metal catalyst, intrinsically slow kinetics, and poor durability under harsh operating environments.

SUMMARY OF THE DISCLOSURE

Flow cell systems are provided. Example flow cell systems can include an $H^+/H_2$ half-cell and a counterpart $Fe^{3+}/Fe^{2+}$ or $V^{5+}/V^{4+}$ half-cell.

Flow cell systems can also include a half cell in fluid communication with an electrolyte regeneration chamber.

Embodiments of these flow cells systems can be configured to produce hydrogen through electrolysis.

Flow cell battery systems are also disclosed. Example flow cell battery systems can include an $H^+/H_2$ analyte; and a counterpart $Fe^{3+}/Fe^{2+}$ or $V^{5+}/V^{4+}$ catholyte.

Processes for generating hydrogen are also disclosed. Example processes can include generating protons from an $Fe^{3+}/Fe^{2+}$ or $V^{5+}/V^{4+}$ electrolyte solution; and reacting the protons with $H_2O$ to form $H_2$.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
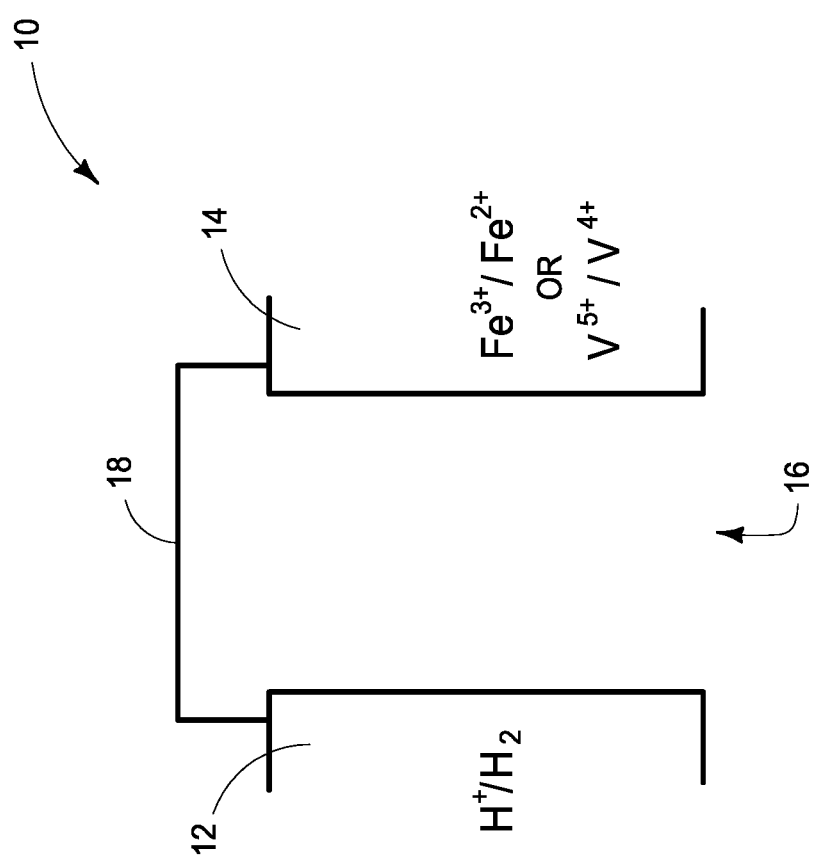
FIG. 1 is a depiction of a flow cell system according to an embodiment of the disclosure.

The present disclosure will be described with reference to FIG. 1-10. Referring first to FIG. 1, a flow cell system 10 is shown that includes two half-cells; one half-cell 12 and another half-cell 14. Within half-cell 12 is included an $H^+/H_2$ system, and within the other half-cell 14 is included an $Fe^{3+}/Fe^{2+}$ system. These systems are aqueous, but must contain these species. The first system of half cell 12 can be referred to as an anolyte system and the second system of half cell 14 can be referred to as a catholyte system. System 10 can include two highly reversible single electron reactions; the $H^+/H_2$ half-cell and the $Fe^{3+}/Fe^{2+}$ half-cell.

It has been determined that this unique chemistry can overcome several of the common problems found in batteries and electrolyzers. The cells themselves can have at least a portion constructed of porous carbon substrates. The system can be configured with half cells as electrodes. In some circumstances, the half-cell 14 including the iron may not require a catalyst, while a low loading of finely dispersed catalyst may be utilized in the half-cell 12 including the hydrogen that can be referred to as the hydrogen half-cell. Catalysts for either one or both of these cells are contemplated to include Pt catalysts.

Referring again to FIG. 1, between half-cells 12 and 14 can be a membrane 16. The membrane 16 can be semipermeable; it can be a hydrogen based membrane; it may also be considered to be a microporous separator. According to example implementations, the membrane can also include sulfonated tetrafluoroethylene based fluoropolymer-copolymer membranes. An example of the hydrocarbon membrane can include sulfonated poly(phenol-sulfone) membranes. However, other ion exchange membranes may prove suitable such as Nafion 117. Suitable alternative membranes can include, but are not limited to, hydrocarbon-based commercially available ion-exchange membranes; for example, SELEMION® anion exchange membrane (APS, from Asahi Glass, Japan), SELEMION® cation exchange membrane (CMV, from Asahi Glass, Japan), and sulfonated poly(phenylsufone) membrane (S-RADEL® (RADEL® from Solvay Advanced Polymers, USA), and micro-porous separators typically used in lithium battery, for example; CELGARD® micro-porous separator (Celgard, USA).

System 10 can also have an electrical connection between the two half-cells represented as 18. Electrical connection 18 can provide electrical communication between the two half-cells in, and this electrical connection can take the form of a wire for example, or it can simply be an apparatus suitable for providing electrons between the two half-cells, or an apparatus that can consume the electrons flowing between the two half cells.

In half-cell 12 for example, the $H^+/H_2$ system can be an aqueously based system that includes primarily water, for example. In half-cell 14, for example, the system can also be aqueously based that includes the iron components having counter-ions such as a sulfate ($FeSO_4$), chloride ($FeCl_2$), and/or nitrates ($Fe(NO_3)_2$). In accordance with example implementations, the concentration of the iron sulfate can be on the order of 0.5M in a sulfuric acid system that is about 0.5M as well. Other ranges are contemplated.

Figure 2:
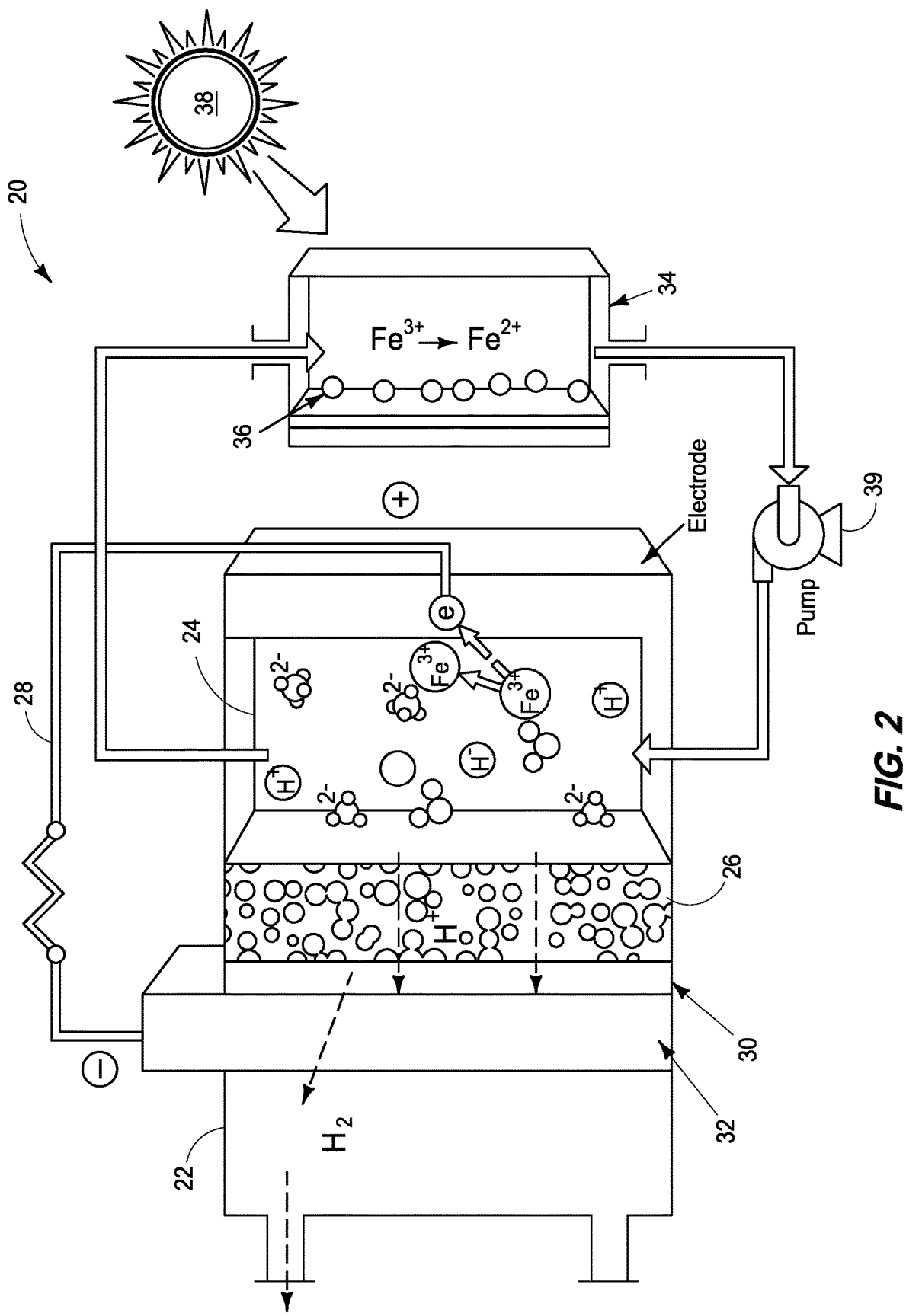
FIG. 2 is a depiction of another flow cell system according to an embodiment of the disclosure.

Referring next to FIG. 2, a more detailed depiction of an electrolyzer or flow cell system that is configured to perform electrolysis of water to hydrogen is depicted. In accordance with example implementations, system 20 can include two half-cells, half-cell 22 and half-cell 24. Half-cell 22 can include an aqueous based solution that is configured to receive water therein and provide hydrogen as a product. Half-cell 24 can include an aqueous solution that includes the iron system described above, and half-cell 24 can include an electrical connection via conduit 28 with a porous media 32 that separates membrane 26 from catalyst 30.

Porous media 32 can include mesoporous carbon material such as carbon paper, carbon fiber, carbon nanotubes; or porous metal materials, a porous ceramic separator and/or a graphite separator. Porous media can also be configured as a polymeric separator. Microporous separators can also be utilized. Celgard porous separators may be used, for example.

Catalyst 30 can be Pt and/or Pd; non-precious metals such as Ni, and/or Co; alloys such as NiMo, NiCo; and/or compounds such as $MoS_2$.

In accordance with example implementations, this electrolysis can be accomplished through the following half-cell reactions:

$$\text{Positive:} H^+ + e^- \rightarrow \tfrac{1}{2} H_2(g) \, E^0 = 0V \tag{1}$$

$$\text{Negative:} Fe^{2+} - 1e^- \rightarrow Fe^{3+} \, E^0 = 0.77V \tag{2}$$

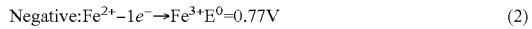

As these reactions indicate, the flow cell system can produce $H_2$ at a much lower voltage and improved efficiency than that of typical water electrolysis system. The continuous production of H2 can be accomplished by heterogeneous photocatalytic reduction of the $Fe^{3+}/Fe^{2+}$ on the catholyte side or half-cell 24.

FIG. 2 also depicts a regeneration chamber 34. This chamber is configured to receive catholyte after being utilized in half-cell 24. Regeneration chamber 34 can include a catalyst 36 such as titanium oxide that may be a photosensitive catalyst and receive energy from solar radiation 38, for example. This should not be considered the only regeneration technique but a regeneration technique. Other regeneration techniques are contemplated that can be utilized in regeneration chamber 34. $WO_3$, $TiO_2$, and/or Cd particles are also considered potential catalysts for the photosensitive regeneration or photoregeneration. Materials for photoregeneration can also include as $CdTe$, $CuSe_2$, $InSe_2$, $GaSe_2$, amorphous silicon, polycrystalline silicon, nano-silicon, micro silicon, photosensitive Dye and photosensitive organic molecules. Pump 39 can be utilized to circulated electrolyte between half cell 24 and chamber 34.

Upon regeneration, $Fe^{2+}$ is generated and returned to half-cell 24, thereby providing a steady-state process that can be used to continually electrolyze water and produce hydrogen. Equation (3) is but one example regeneration scheme.

$$\text{Regeneration:} \; Fe^{3+} + \tfrac{1}{2} H_2O + hv \xrightarrow{TiO_2} Fe^{2+} + \tfrac{1}{4} O_2 + H^+ \tag{3}$$

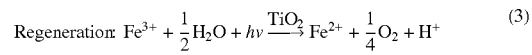

Figure 3:
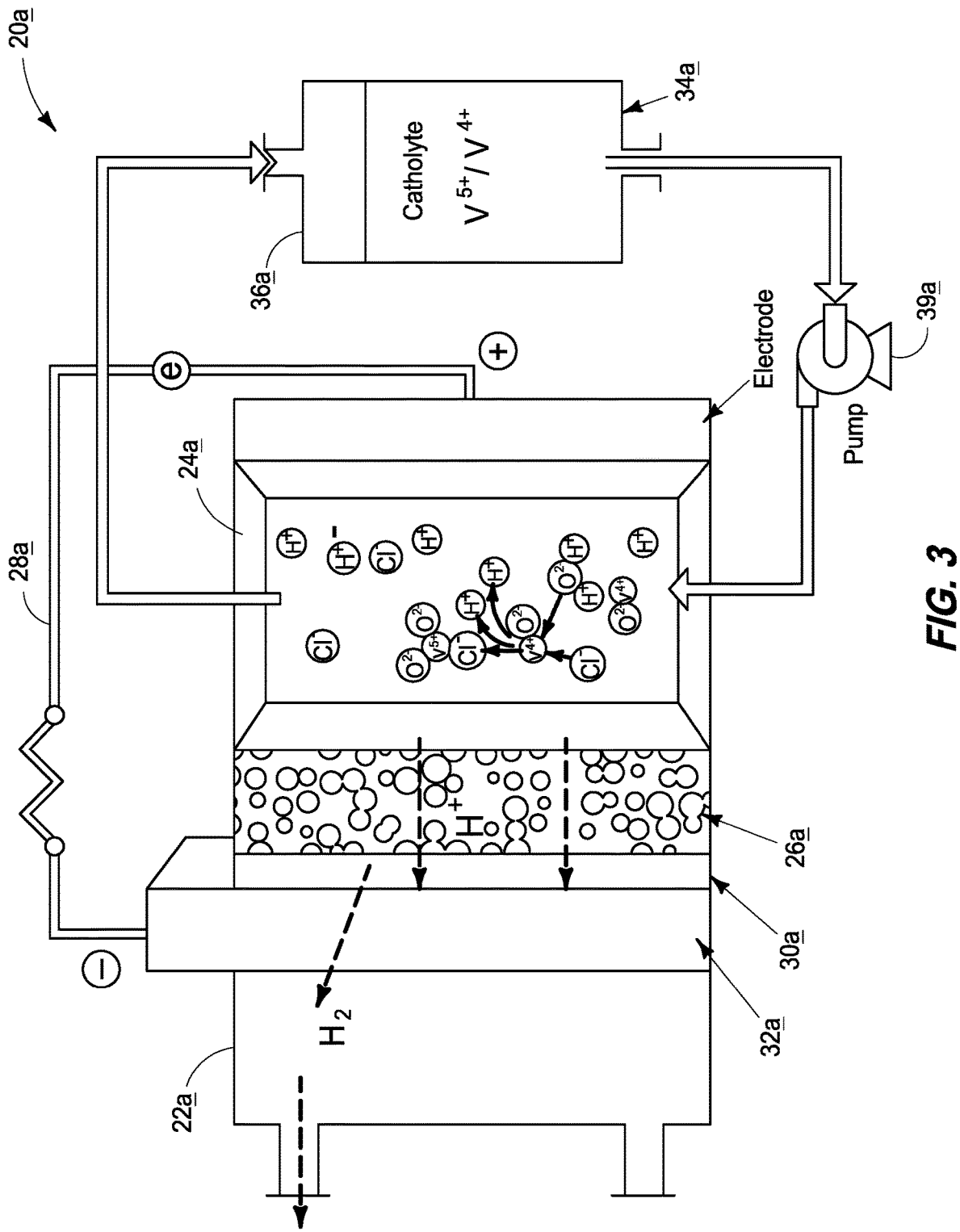
FIG. 3 is a depiction of another flow cell system according to an embodiment of the disclosure.
Figure 4:
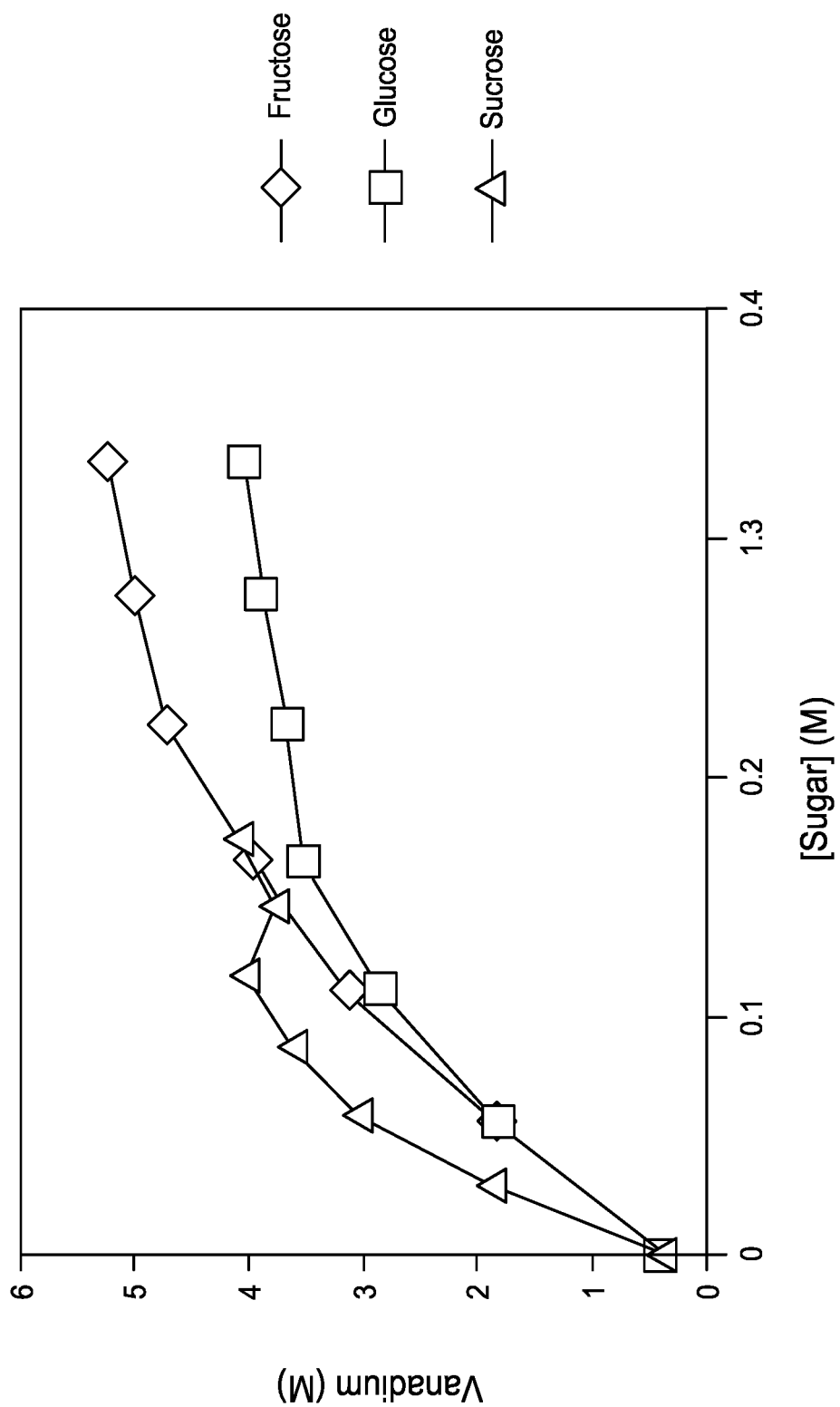
FIG. 4 is a plot of increased V4+ ions from carbohydrate reduction according to an embodiment of the disclosure.

Referring Next to FIG. 3 an example flow cell battery configuration is shown as flow cell system 20a utilizing another redox couple ($V^{5+}/V^{4+}$) other than the $Fe^{3+}/Fe^{2+}$ redox couple. Example redox couples can include metal ions, inorganic or organic redox active ions. Shown in the FIG. 3 is an example redox couple using the vanadium redox couple $V^{5+}/V^{4+}$ to replace rather than $Fe^{3+}/Fe^{2+}$. As can be seen, system 20a includes two half-cells (24a and 22a), a hydrogen half-cell 22a and an Vanadium half-cell 24a, with the hydrogen and Vanadium not depicting the cell's construction but actually the content of the aqueous media within each of the cells. As can be seen, Vanadium can be paired with Chloride ($VOCl_2$) and/or sulfate ($VOSO_4$). It can also include an electrical conduit 28a as well as a membrane 26a, catalyst 30a, and porous media 32a.

In accordance with example implementations, this electrolysis can be accomplished through the following half-cell reactions:

$$\text{Positive:} H^+ e^- \rightarrow \tfrac{1}{2} H_2(g) \, E^0 = 0V$$

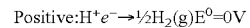

$$\text{Negative:} VO_2^+ + 1e^- + 2H^+ \rightarrow VO^{2+} + H_2O \, E^0 = 1.00V$$

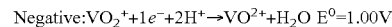

In accordance with example implementations, flow cell system 20a can also include a catholyte regeneration chamber 34a that can be utilized to regenerate the catholyte for continuous operation. Regeneration methods described above can be utilzed. In addition, the regeneration of $V^{4+}$ from $V^{5+}$ can also be done chemically by adding carbohydrate materials in accordance with the following equations (4) and (5).

Various forms of carbohydrate, such as glucose ($C_6H_{12}O_6$); fructose ($C_6H_{12}O_6$) and sucrose ($C_{12}H_{22}O_{11}$), can be used to facilitate chemical reduction. In accordance with example implementations, the redox reactions of example system 20a configurations are shown in Equations (4) and (5) below. The increase of V(IV) ions concentration from the carbohydrate reduction of V(V) ions in 6M sulfuric acid at room temperature are shown in FIG. 2.

$$24VO_2^+ + C_6H_{12}O_6 + 24H^+ = 24VO^{2+} + 18H_2O + 6CO_2 \tag{4}$$

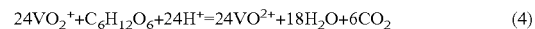

$$48VO_2^+ + C_{12}H_{22}O_{11} + 48H^+ = 48VO^{2+} + 35H_2O + 12CO_2 \tag{5}$$

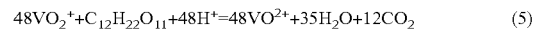

There are multiple uses for the combination of the flow cell systems and/or batteries of the present disclosure. For example, the flow cell systems can be charged by wind, solar, or combustion generating systems. The flow cell systems can be configured to discharge directly to a power grid and/or a hydrogen storage. Hydrogen storage can be configured to discharge to gas pipelines, including natural gas pipelines, to storage commercial storage tanks, to cars, and/or to fuel cells. These fuel cells can also be configured to discharge to an electrical grid as well. This is a broad sampling of the many uses contemplated in present disclosure.

Figure 5:
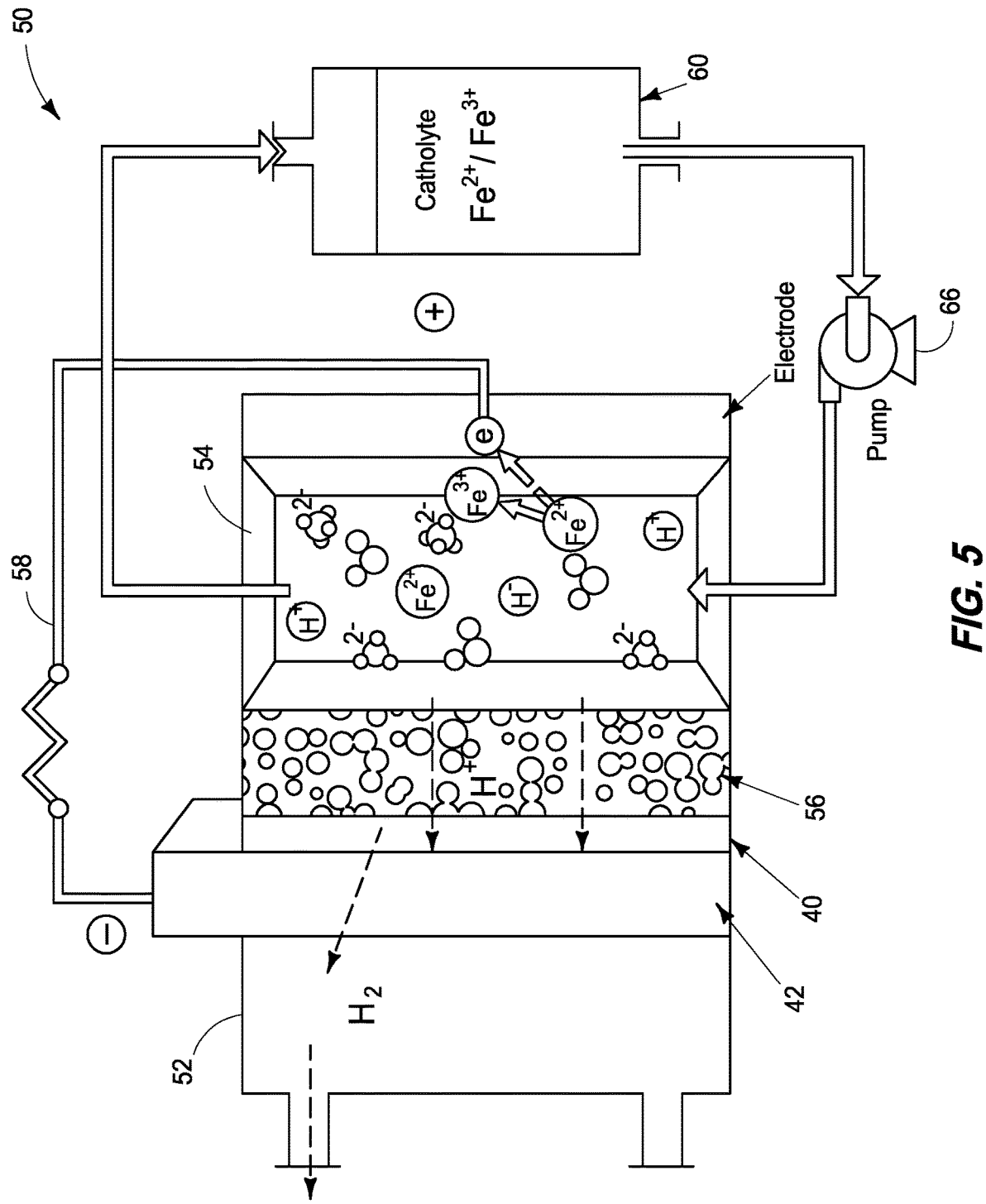
FIG. 5 is a depiction of a flow cell battery system according to an embodiment of the disclosure.

Referring next to FIG. 5, an example flow cell battery configuration is shown as flow cell battery system 50. As can be seen, system 50 includes two half-cells, a hydrogen half-cell 52 and an iron half-cell 54, with the hydrogen and iron not depicting the cell's construction but actually the content of the aqueous media within each of the cells. It can also include an electrical conduit 58 as well as a membrane 56, catalyst 40, and porous media 42. In accordance with example implementations, flow cell battery system 50 can also include a catholyte storage tank 60 that can be utilized to store additional catholyte for cycle through system 50. In accordance with example implementations, the redox reactions of example system 50 configurations is shown in Equations (6) and (7) below.

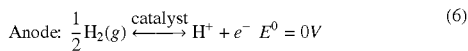

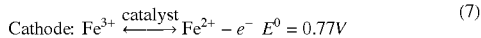

Operational data for a typical PEM electrolysis and fuel cell with a 50 micron membrane can be compared with example data from an iron hydrolysis flow cell system. Consistent with this data, round trip energy storage efficiency for an electrolyzer/fuel cell combination can be about 35%, when using precious metal catalyst. The $Fe^{3+}/Fe^{2+}$ system that replaces these precious metals is a single electron reaction having a very low overpotential on porous carbon electrodes, with a low catalyst loading. Again, example catalysts that can be used include Pt as well as non-PGM catalysts.

Figure 6:
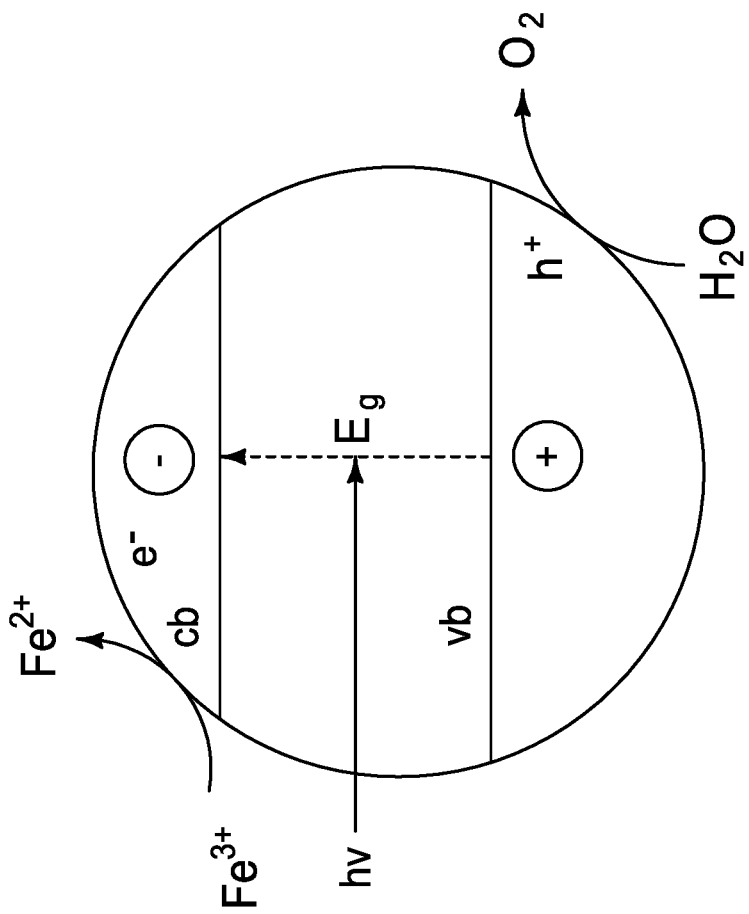
FIG. 6 is an example regeneration scheme according to an embodiment of the disclosure.

Referring to FIG. 6, a depiction of the catalytic regeneration of $Fe^{3+}$ is shown. This generation of protons can maintain the mass balance of the overall processes of cathode hydrogen generation and anode electrolyte regeneration. While the systems have been described separately as flow cell systems and/or flow cell battery systems, the systems can be constructed similarly but configured for different utilization.

Figure 7:
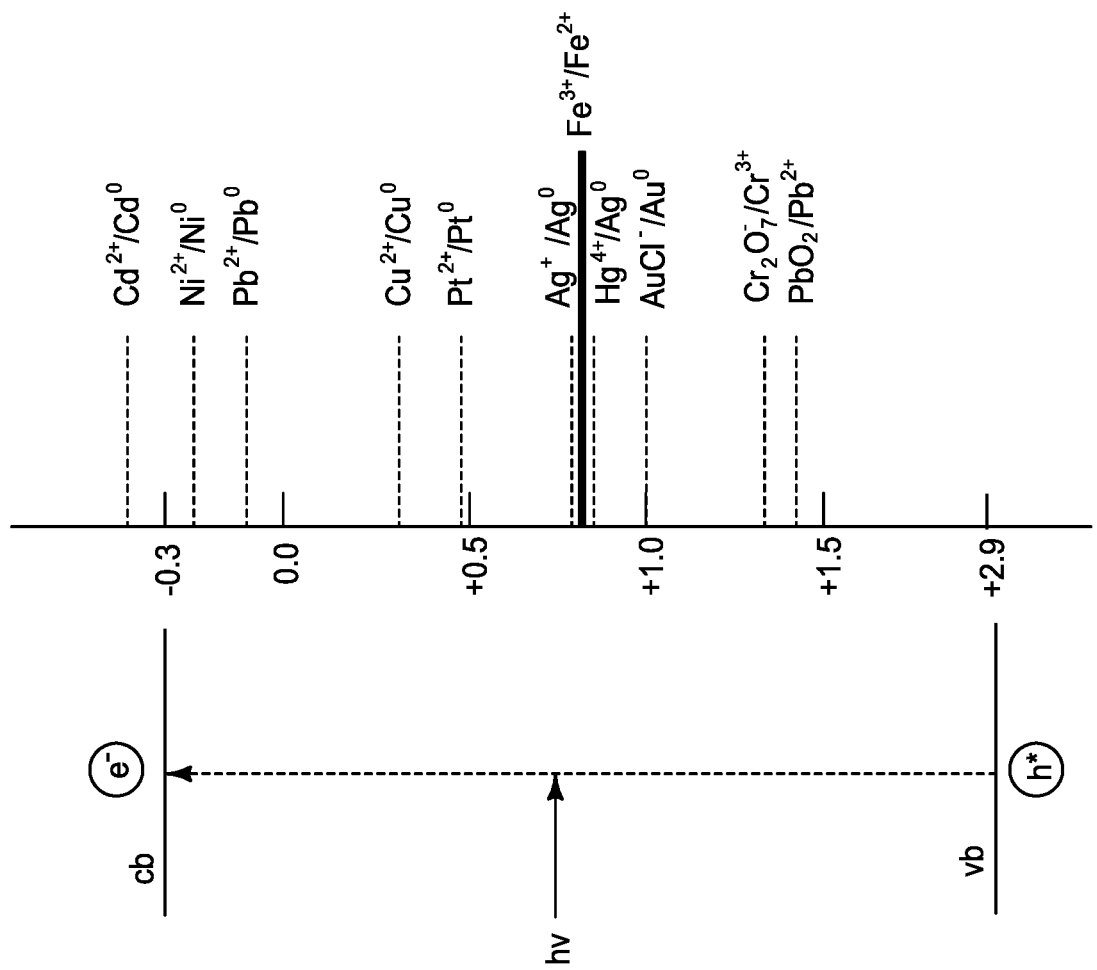
FIG. 7 is relative redox potentials of various metallic couples to the energy levels of conduction and valence bands of $TiO_2$.

In accordance with example implementations and with reference to FIG. 7, relative redox potentials of various metallic couples to the energy levels of the conduction and valence bands of $TiO_2$ are shown, depicting the iron system in bold. This replacement can lower the operational voltage of the hydrogen generator, but also significantly improve overall efficiency due to the faster kinetics. Compared with the $H_2O/O_2$ redox reaction, which has an onset potential at about 1.7V, shown in FIG. 7, the starting potential for $Fe^{2+}$ oxidation is about 0.77V or about 65% lower.

Figure 8:
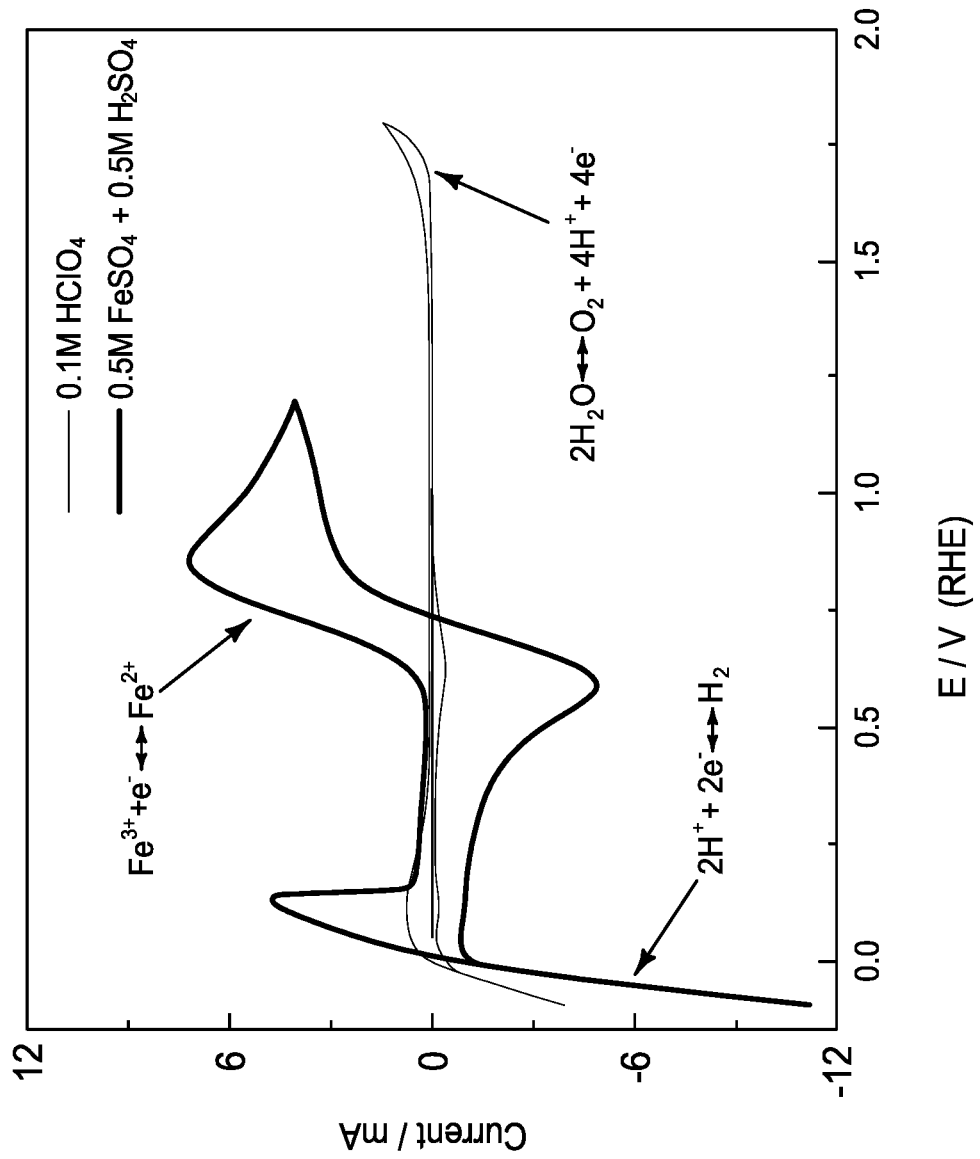
FIG. 8 is a depiction of a cyclic voltammetry study of the $H^+/H_2$ and $Fe^{3+}/Fe^{2+}$ redox reactions in various solutions on a Pt working electrode according to an example embodiment.
Figure 9:
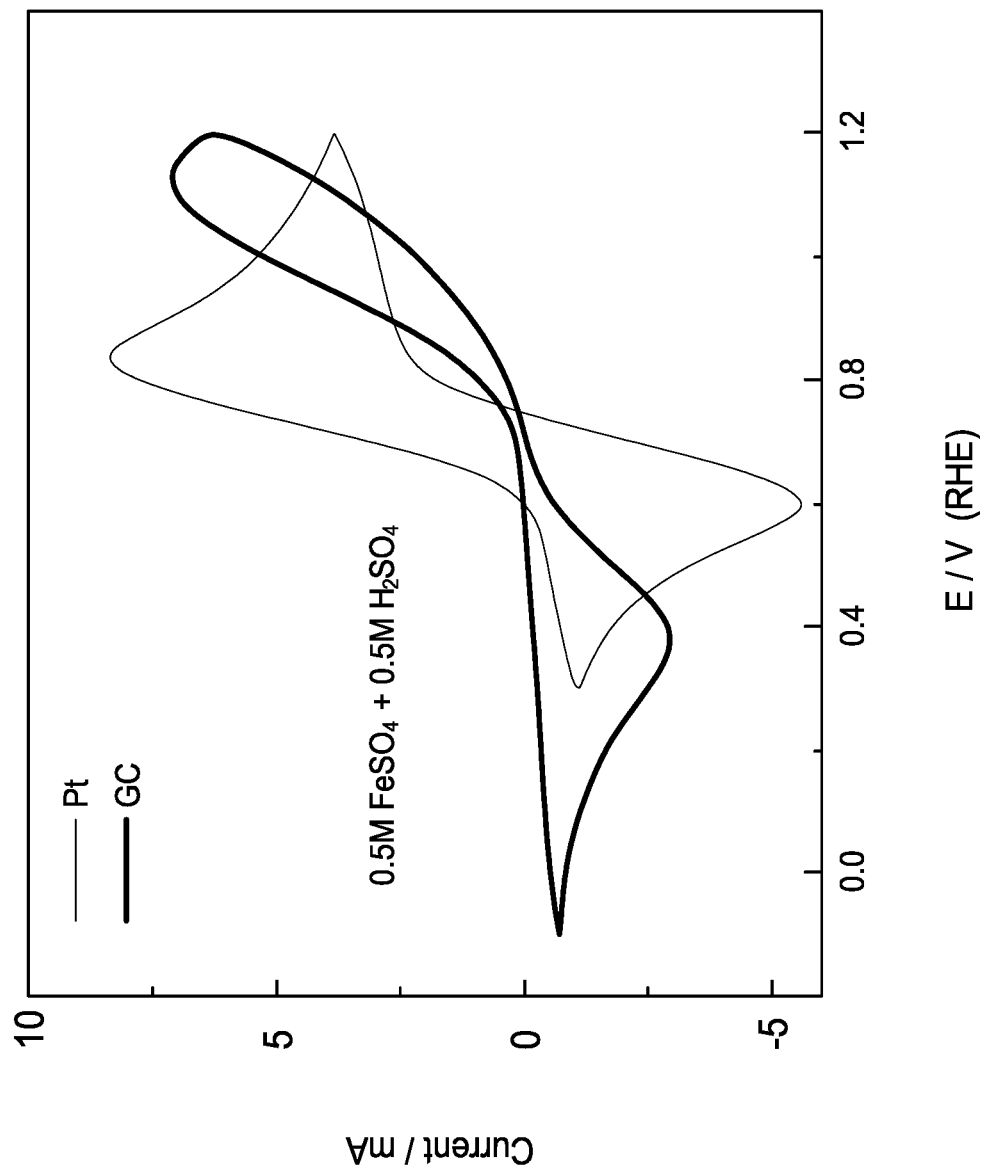
FIG. 9 is an example $Fe^{2+}/Fe^{3+}$ redox reaction on various electrodes according to an embodiment of the disclosure.

Referring next to FIGS. 8 and 9, voltammetry studies are shown that include the iron system and hydrogen systems. From the data depicted in FIG. 8, it would appear that the crossover of iron species from the anode to the cathode would not interfere with $H_2$ generation as suggested by this preliminary study. In the electrolyte of a 0.5M iron sulfate in 0.5M sulfuric acid, both the $H^+/H_2$ and the $Fe^{3+}/Fe^{2+}$ redox reactions are highly reversible on Pt electrodes. FIG. 8 also experimentally demonstrated that the $Fe^{3+}/Fe^{2+}$ potential is significantly lower than the potential of oxygen reduction/oxidation reaction. In accordance with example implementations, in the energy storage mode or flow cell battery systems, it may be possible to use carbon electrodes which reduce capital expenditure even further. However, as shown in FIG. 9, the $Fe^{3+}/Fe^{2+}$ redox reactions kinetics on the glassy carbon electrode are significantly slower than on the Pt electrode resulting in a limiting current density of <200 mA/cm². Therefore, it may be advisable to disperse low-loading Pt.

Figure 10:
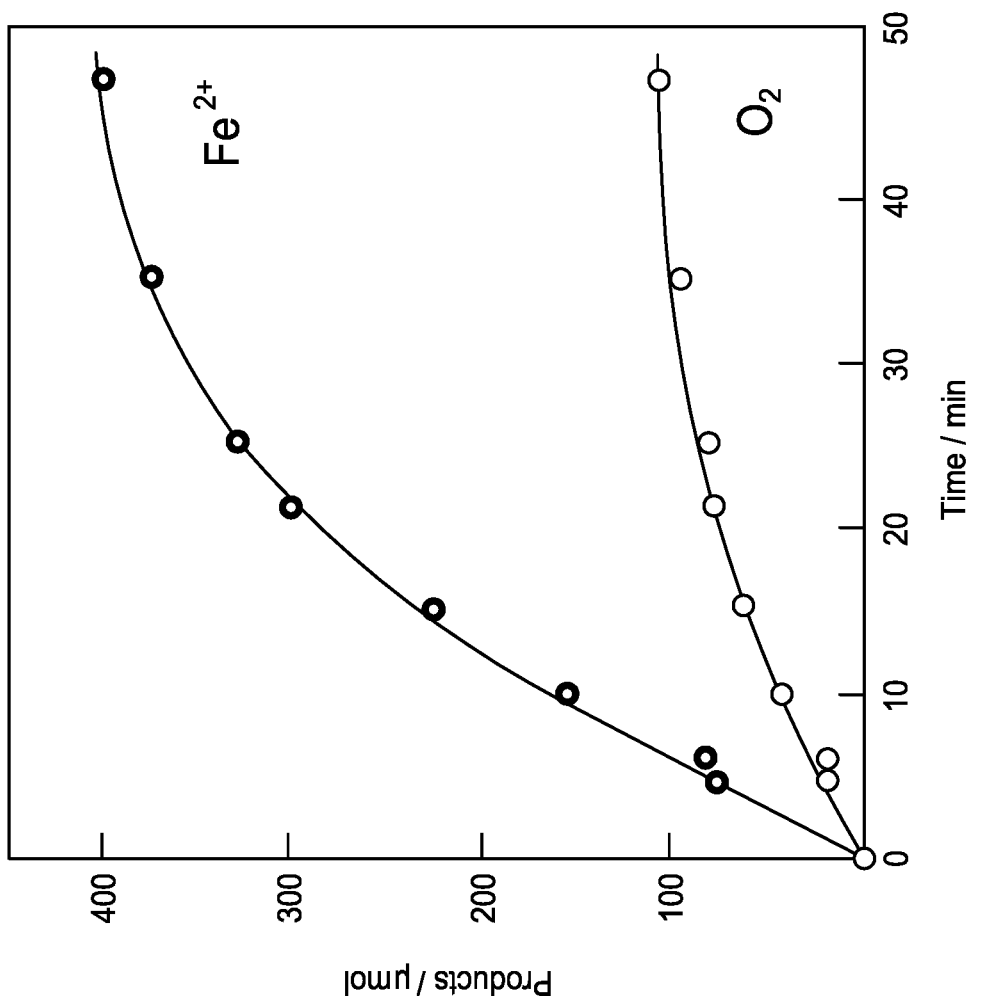
FIG. 10 is a depiction of a photocatalytic generation of $Fe^{2+}$ ions and oxygen with $Fe^{3+}$ ions on $TiO_2$ according to example implementations.

Referring next to FIG. 10, an example depiction in terms of photocatalytic generation of $Fe^{2+}$ ions and oxygen with $Fe^{3+}$ ions on $TiO_2$ is shown graphically. It may be that $Fe^{3+}$ ions generated may be absorbed onto the catalyst such as $TiO_2$ because they are converted in total over time.

$Fe^{3+}$ can be regenerated catalytically. This generation of protons can maintain the mass balance of the overall processes of cathode hydrogen generation and anode electrolyte regeneration. While the systems have been described separately as flow cell systems and/or flow cell battery systems, the systems can be constructed similarly but configured for different utilization. In accordance with example implementations, the systems can be configured in accordance with accepted chemical engineering techniques.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A flow cell system comprising:
   two electrically coupled half cells, the first half cell of the two half cells comprising a $H^+/H_2$ system and the second half cell of the two half cells comprising a $V^{5+}/V^{4+}$ system;
   a semi-permeable membrane operatively engaged between the two half cells; and
   an electrolyte regeneration chamber in fluid communication with the second half cell, the chamber configured to receive solar radiation and define a single continuous chamber containing one or more of $CuSe_2$, $InSe_2$, $GaSe_2$, amorphous silicon, polycrystalline silicon, nano-silicon, and/or micro silicon.

2. The flow cell system of claim 1 wherein either or both of the half cells comprise a portion constructed of a porous carbon substrate.

3. The flow cell system of claim 2 wherein the porous carbon substrate is electrically connected.

4. The flow cell system of claim 1 wherein either of both of the half cells comprise a catalyst.

5. The flow cell system of claim 4 wherein the catalyst comprises Pd.

6. The flow cell system of claim 1 wherein each of the half cell systems is aqueous.

7. The flow cell system of claim 1 further comprising a porous media between the two half cells.

8. The flow cell system of claim 7 wherein the porous media is a mesoporous carbon material.

9. The flow cell system of claim 8 wherein the porous media comprises one or more of carbon paper, carbon fiber, and/or carbon nanotubes.

10. The flow cell system of claim 8 further comprising a catalyst material between the semi-permeable membrane and the porous media.

11. The flow cell system of claim 10 wherein the catalyst comprises one or more of Pt, Pd, Ni, Co, NiMo, NiCo, and/or $MoS_2$.

* * * * *